United States Patent
Daherkar et al.

(10) Patent No.: US 9,514,201 B2
(45) Date of Patent: Dec. 6, 2016

(54) METHOD AND SYSTEM FOR NON-INTRUSIVE EVENT SEQUENCING

(75) Inventors: Atul R. Daherkar, Burlingame, CA (US); Manoj Khangaonkar, Foster City, CA (US); Hong Sun, Cupertino, CA (US); Kai Mike Zhang, West Linn, OR (US); Chendong Zou, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 1148 days.

(21) Appl. No.: 11/549,613

(22) Filed: Oct. 13, 2006

(65) Prior Publication Data

US 2008/0091712 A1   Apr. 17, 2008

(51) Int. Cl.
G06F 7/00 (2006.01)
G06F 17/00 (2006.01)
G06F 17/30 (2006.01)

(52) U.S. Cl.
CPC ... *G06F 17/30557* (2013.01); *G06F 17/30362* (2013.01)

(58) Field of Classification Search
CPC ............... G06F 17/30557; G06F 17/30362; G06F 17/3036
USPC ...................... 707/8, 999.008, 704
See application file for complete search history.

(56) References Cited

U.S. PATENT DOCUMENTS

| | | | |
|---|---|---|---|
| 5,305,454 A | 4/1994 | Record et al. | |
| 5,465,328 A | 11/1995 | Dievendorff et al. | |
| 5,544,318 A | 8/1996 | Schmitz et al. | |
| 5,682,537 A | 10/1997 | Davies et al. | |
| 5,913,213 A | 6/1999 | Wikstrom et al. | |
| 6,012,094 A | 1/2000 | Leymann et al. | |
| 6,108,654 A | 8/2000 | Chan et al. | |
| 6,112,225 A | 8/2000 | Kraft et al. | |
| 6,125,363 A * | 9/2000 | Buzzeo et al. | 707/100 |

(Continued)

FOREIGN PATENT DOCUMENTS

EP    1603307 A2    12/2005

OTHER PUBLICATIONS

Roland Barcia, Jeff Brent, "IBM WebSphere Developer Technical Journal: Building SOA solutions with the Service Component Architecture—Part 1", Oct. 26, 2005.*

(Continued)

*Primary Examiner* — Brannon W Smith
(74) *Attorney, Agent, or Firm* — Janaki K. Davda; Konrad, Raynes, Davda & Victor LLP

(57) ABSTRACT

A system has a repository that stores a plurality of events. Each event requests to utilize one or more functions in a component. An event sequencing module analyzes an event sequencing key of the event if the event requests a function having a component definition that includes an event sequence qualifier. The event sequencing module grants a lock to the event for the function if no other event having the same value for the event sequencing key has the lock for the function. The event sequencing module prevents the event from being processed if another event having the same value for the event sequencing key has the lock for the function. The event sequencing key is composed of one or more object attributes. The system has a worker server that receives the event, if the event obtains the lock, and processes the function requested by the event.

30 Claims, 5 Drawing Sheets

(56) References Cited

U.S. PATENT DOCUMENTS

| | | | |
|---|---|---|---|
| 6,128,611 A * | 10/2000 | Doan et al. | G06F 17/30893 707/779 |
| 6,178,440 B1 | 1/2001 | Foster et al. | |
| 6,189,007 B1 * | 2/2001 | Boonie et al. | G06F 17/30362 707/611 |
| 6,233,585 B1 * | 5/2001 | Gupta et al. | G06F 9/466 |
| 6,438,745 B1 | 8/2002 | Kanamaru et al. | |
| 6,442,572 B2 | 8/2002 | Leymann et al. | |
| 6,449,614 B1 | 9/2002 | Marcotte | |
| 6,601,233 B1 | 7/2003 | Underwood | |
| 6,625,602 B1 | 9/2003 | Meredith et al. | |
| 6,654,948 B1 | 11/2003 | Konuru et al. | 717/127 |
| 6,681,230 B1 | 1/2004 | Blott et al. | 707/104.1 |
| 6,697,802 B2 | 2/2004 | Ma et al. | 707/6 |
| 6,742,016 B1 | 5/2004 | Bhoj et al. | |
| 6,880,086 B2 | 4/2005 | Kidder et al. | |
| 6,976,263 B2 | 12/2005 | Delaney | |
| 6,993,246 B1 | 1/2006 | Pan et al. | 386/52 |
| 7,020,696 B1 | 3/2006 | Perry et al. | |
| 7,047,258 B2 | 5/2006 | Balogh et al. | 707/201 |
| 7,206,848 B1 | 4/2007 | Zara et al. | |
| 7,222,119 B1 | 5/2007 | Ghemawat et al. | |
| 7,921,075 B2 | 4/2011 | Herness et al. | |
| 2002/0007363 A1 | 1/2002 | Vaitzblit | |
| 2002/0016729 A1 | 2/2002 | Breitenbach et al. | 705/9 |
| 2002/0038332 A1 | 3/2002 | Alverson et al. | |
| 2003/0004970 A1 | 1/2003 | Watts | |
| 2003/0061256 A1 | 3/2003 | Mathews et al. | |
| 2003/0083912 A1 | 5/2003 | Covington, III et al. | 705/7 |
| 2004/0068501 A1 | 4/2004 | McGoveran | |
| 2004/0093510 A1 | 5/2004 | Nurmela | 726/23 |
| 2004/0162741 A1 | 8/2004 | Flaxer et al. | 705/7 |
| 2004/0178454 A1 | 9/2004 | Kuroda et al. | 257/360 |
| 2004/0193510 A1 | 9/2004 | Catahan, Jr. et al. | 705/28 |
| 2004/0215614 A1 | 10/2004 | Doyle et al. | |
| 2004/0220931 A1 | 11/2004 | Guthridge et al. | |
| 2004/0220932 A1 | 11/2004 | Seeger et al. | |
| 2004/0220933 A1 | 11/2004 | Walker | |
| 2005/0021354 A1 * | 1/2005 | Brendle et al. | 705/1 |
| 2005/0080806 A1 | 4/2005 | Doganata et al. | 707/102 |
| 2005/0091663 A1 | 4/2005 | Bagsby | 716/315 |
| 2005/0166187 A1 * | 7/2005 | Das et al. | 717/136 |
| 2005/0256961 A1 | 11/2005 | Alon et al. | 709/229 |
| 2005/0262130 A1 | 11/2005 | Mohan | 707/102 |
| 2006/0004757 A1 | 1/2006 | Watts | |
| 2006/0080486 A1 | 4/2006 | Yan | |
| 2006/0095571 A1 | 5/2006 | Gilgen et al. | |
| 2006/0136914 A1 | 6/2006 | Marascio et al. | |
| 2006/0149877 A1 | 7/2006 | Pearson | |
| 2006/0167955 A1 | 7/2006 | Vertes | 707/201 |
| 2006/0218290 A1 * | 9/2006 | Lin et al. | 709/229 |
| 2006/0259911 A1 | 11/2006 | Weinrich et al. | |
| 2006/0282400 A1 * | 12/2006 | Kalavacharla | G06F 9/466 |
| 2007/0226139 A1 | 9/2007 | Crumbach et al. | |
| 2008/0082761 A1 * | 4/2008 | Herness et al. | 711/152 |
| 2008/0091679 A1 * | 4/2008 | Herness et al. | 707/8 |
| 2008/0091712 A1 | 4/2008 | Daherkar et al. | |
| 2008/0148299 A1 | 6/2008 | Daherkar et al. | |

OTHER PUBLICATIONS

Yongli An et al, "WebSphere® and DB2® Clustering and Scalability Study Installation and Configuration Guide", 2002.*
IBM, "WebSphere Process Server for Multiplatforms Version 6.1.0: Administering WebSphere Process Server", 2005.*
IBM, "WebSphere Process Server for Multiplatforms Version 6.1.0: Product Overview", 2005.*
Cook et al, "Event-Based Detection of Concurrency", 1998.*
U.S. Appl. No. 11/536,941, filed Sep. 29, 2006, Herness et al.
Mansouri-Samani, Masoud; Sloman, Morris; "A Configurable Event Service for Distributed Systems," Department of Computing, Imperial College of Science, Technology and Medicine, IEEE, 1996, pp. 210-217.
Meyer, K.; Gas, B.; Doughty, J.; "The Devolution of Functional Analysis," Workpaper, Honeywell Information Systems, Ltd., Oct. 26, 1982, pp. 65-91.
Arpaci-Dusseau, Andrea Carol; "Implicit Coscheduling: Cooridnated Scheduling with implicit Information in Distributed Systems," ACM Tranactions on Computer Systems, vol. 19, No. 3, Aug. 2001, pp. 283-331.
Rinard, Martin C.; Diniz, Pedro C.: "Eliminating Synchronization Botttlenecks Using Adaptive Replication," ACM Transactions on Programming Languages and Systems, vol. 25, No. 3, May 2003, pp. 316-359.
Doug Tidwell, Programming WEb Services with SOAP, Dec. 2001, O'Reilly, First Edition, 225 pages.
Ethan Cerami, Web Services Essentials, Feb. 2002, O'Reilly, First Edition, 286 pages.
Websphere 6.0.2 by IBM, Oct. 7, 2005, 9 pages.
Amendment 1, Oct. 24, 2010, for U.S. Appl. No. 11/549,609, filed Oct. 13, 2006, by A.R. Daherkar et al., Total 16 pp.
Amendment 2, Apr. 14, 2011, for U.S. Appl. No. 11/549,609, filed Oct. 13, 2006, by A.R. Daherkar et al., Total 12 pp.
Amendment 3, Sep. 8, 2011, for U.S. Appl. No. 11/549,609, filed Oct. 13, 2006, by A.R. Daherkar et al., Total 16 pp.
Appeal Brief, Mar. 26, 2012, for U.S. Appl. No. 11/549,609, filed Oct. 13, 2006, by A.R. Daherkar et al., Total 22 pp.
Examiner's Answer, Apr. 26, 2012, for U.S. Appl. No. 11/549,609, filed Oct. 13, 2006, by A.R. Daherkar et al., Total 15 pp.
Final Office Action 1, Jan. 19, 2011, for U.S. Appl. No. 11/549,609, filed Oct. 13, 2006, by A.R. Daherkar et al., Total 25 pp.
Final Office Action 2, Oct. 24, 2011, for U.S. Appl. No. 11/549,609, filed Oct. 13, 2006, by A.R. Daherkar et al., Total 23 pp.
Notice of Appeal, Jan. 24, 2012, for U.S. Appl. No. 11/549,609, filed Oct. 13, 2006, by A.R. Daherkar et al., Total 2 pp.
Office Action 1, Jul. 27, 2010, for U.S. Appl. No. 11/549,609, filed Oct. 13, 2006, by A.R. Daherkar et al., Total 22 pp.
Office Action 3, Jun. 8, 2011, for U.S. Appl. No. 11/549,609, filed Oct. 13, 2006, by A.R. Daherkar et al., Total 39 pp.
Reply Brief, Jun. 25, 2012, for U.S. Appl. No. 11/549,609, filed Oct. 13, 2006, by A.R. Daherkar et al., Total 12 pp.
Pre-Interview Office Action 1, Oct. 27, 2008, for U.S. Appl. No.11/536,962, filed Sep. 29, 2006 by Herness et al., Total 11 pp.
First Action Interview Office Action 1, Dec. 24, 2008, for U.S. Appl. No. 11/536,962, filed Sep. 29, 2006 by Herness et al., Total 8 pp.
Response to Pre-Interview Communication, Nov. 13, 2008, for U.S. Appl. No.11/536,962, filed Sep. 29, 2006 by Herness et al., Total 8 pp.
Response to Pre-Interview Communication, Dec. 24, 2008, for U.S. Appl. No. 11/536,962, filed Sep. 29, 2006 by Herness et al., Total 8 pp.
Supplemental Amendment, Jan. 8, 2009, for U.S. Appl. No. 11/536,962, filed Sep. 29, 2006 by Herness et al., Total 20 pp.
Final Office Action 1, May 14, 2009, for U.S. Appl. No. 11/536,962, filed Sep. 29, 2006 by Herness et al., Total 42 pp.
Response to Final Office Action 1, Aug. 11, 2009, for U.S. Appl. No. 11/536,962, filed Sep. 29, 2006 by Herness et al., Total 24 pp.
Office Action 4, Dec. 1, 2009, forU.S. Appl. No. 11/536,962, filed Sep. 29, 2006 by Herness et al., Total 39 pp.
Response to Office Action 4, Mar. 1, 2010, for U.S. Appl. No. 11/536,962, filed Sep. 29, 2006 by Herness et al., Total 22 pp.
Final Office Action 2, May 28, 2010, for U.S. Appl. No. 11/536,962, filed Sep. 29, 2006 by Herness et al., Total 49 pp.
Response to Final Office Action 2, Aug. 19, 2010, for U.S. Appl. No. 11/536,962, filed Sep. 29, 2006 by Herness et al., Total 11 pp.
Notice of Allowance 1, Sep. 7, 2010, for U.S. Appl. No. 11/536,962, filed Sep. 29, 2006 by Herness et al., Total 24 pp.
Notice of Allowance 2, Nov. 23, 2010, for U.S. Appl. No. 11/536,962, filed Sep. 29, 2006 by Herness et al., Total 27 pp.
Office Action 1, Nov. 14, 2008, for U.S. Appl. No. 11/536,941, filed Sep. 29, 2006 by Herness et al., Total 18 pp.
Response to Office Action 1, Dec. 8, 2008, for U.S. Appl. No. 11/536,941, filed Sep. 29, 2006 by Herness et al., Total 7 pp.
Notice of Allowance 1, Jan. 14, 2009, for U.S. Appl. No. 11/536,941, filed Sep. 29, 2006 by Herness et al., Total 9 pp.

(56) References Cited

OTHER PUBLICATIONS

Amendment 2, Apr. 13, 2009, for U.S. Appl. No. 11/536,941, filed Sep. 29, 2006 by Herness et al., Total 9 pp.
Notice of Allowance 2, May 15, 2009, for U.S. Appl. No. 11/536,941, filed Sep. 29, 2006 by Herness et al., Total 11 pp.
Notice of Allowance 3, Jun. 22, 2009, for U.S. Appl. No. 11/536,941, filed Sep. 29, 2006 by Herness et al., Total 10 pp.
Office Action 5, Jun. 29, 2015, for U.S. Appl. No. 11/549,609, filed Oct. 13, 2006 by A.R. Daherkar et al., Total 24 pp.
"Index of FTP", [online], [Retrieved on Sep. 21, 2015]. Retrieved from the Internet at <URL: ftp://public.dhe.ibm. . com/software/websphere/integration/wps/library/infocenter/doc/>, Total 1 p.
IBM, "WebSphere Process Server Library", [online], [Retrieved on Sep. 21, 2015]. Retrieved from the Internet at <URL: hftp://www-01.ibm.com/software/integration/wps/library/infocenter/>, Total 1 p.
IBM, "WebSphere Process Server Version 6.0.1 Administering WebSphere Process Server", Dec. 23, 2005, © International Business Machines Corporation 2005, Total 338 pp.
IBM, "WebSphere Process Server for Multiplatforms Version 6.0.2 Administering WebSphere Process Server", Dec. 22, 2006, © International Business Machines Corporation 2005, 2006, Total 288 pp.
IBM, "WebSphere Process Server Version 6.0 Administering", Sep. 29, 2005, © International Business Machines Corporation 2005, Total 228 pp.
IBM, "WebSphere Process Server Version 6.0.1 Product Overview", Dec. 23, 2005, © International Business Machines Corporation 2005, Total 44 pp.
IBM, "WebSphere Process Server Version 6.0 Product Overview", Sep. 29, 2005, © International Business Machines Corporation 2005, Total 36 pp.
Response to Decision on Appeal, May 25, 2015, for U.S. Appl. No. 11/549,609, filed Oct. 13, 2006 by A.R. Daherkar et al., Total 13 pp.
Decision on Appeal, Mar. 26, 2015, for U.S. Appl. No. 11/549,609, filed Oct. 13, 2006 by A.R. Daherkar et al., Total 9 pp.
Response to Office Action 5, Sep. 29, 2015, for U.S. Appl. No. 11/549,609, filed Oct. 13, 2006 by A.R. Daherkar et al., Total 16 pp.
Arpaci-Dusseau, Andrea Carol, "Implicit Coscheduling: Coordinated Scheduling with Implicit Information in Distributed Systems", ACM Transactions on Computer Systems, vol. 19, No. 3, Aug. 2001, pp. 283-331.
Rinard, M.C. And P.C. Diniz, "Eliminating Synchronization Bottlenecks Using Adaptive Replication", ACM Transactions on Programming Languages and Systems, vol. 25, No. 3, May 2003, pp. 316-359.
Tidwell, D., J. Snell, and P. Kulchenko, "Programming Web Services with SOAP", Dec. 2001, O'Reilly, First Edition, Total 225 pp.
Ethan Cerami, "Web Services Essentials", Feb. 2002, O'Reilly, First Edition, Total 286 pp.
Websphere 6.0.2, with "Processing events in a Sequence" and "Quality of service: Qualifiers for mediation services" sections, Copyright 2005 and 2007, Total 9 pp.
Notice of Allowance, Nov. 12, 2015, for U.S. Appl. No. 11/549,609, filed Oct. 13, 2006 by A.R. Daherkar et al., Total 9 pp.
Notice of Allowability, Dec. 24, 2015, for U.S. Appl. No. 11/549,609, filed Oct. 13, 2006 by A.R. Daherkar et al., Total 4 pp.

\* cited by examiner

METHOD AND SYSTEM FOR NON-INTRUSIVE EVENT SEQUENCING

BACKGROUND

1. Field

This disclosure generally relates to software integration. More particularly, the disclosure relates to processing events in a software integration environment.

2. General Background

A business integration environment allows a plurality of business applications to work together. In particular, a source enterprise application may be utilized to transmit business data to a target enterprise application. The source enterprise application first sends data to a source adapter component. The source adapter component is a standardized interface that allows the source enterprise application to communicate with process server components. Accordingly, the business data may then be transmitted from the source adapter component to several process server components. Further, the process server components may then transmit the business data to a target adapter component. The target adapter component is a standardized interface that allows the process server components to communicate with the target enterprise application. Finally, the target adapter component may then transmit the business data to the target enterprise application so that the target enterprise application can utilize the business data. Applications, such as external web services, web applications, and java clients can directly invoke process server components that update an enterprise application via the adapter associated with the enterprise application.

The source enterprise application may generate the business data in a particular order. This business data is modeled as one or more business objects, which are instances of a framework for modeling and manipulating data. In one embodiment, the one or more business objects are defined in XML. Further, in one embodiment, java can be utilized to programmatically create instances and programmatically manipulate business data. After creating the customer business object, the source enterprise application may send a series of updates to the customer business object, e.g., a first update and a second update. Accordingly, the target enterprise application should receive the customer business object, the first update, and the second update from the source enterprise application in the same order in which the source enterprise application sent the business data to ensure accurate processing.

In asynchronous communication, a client can send data to a target computer and return without having to wait for the data to be processed. Further, the target computer can process the data at a later time. In an asynchronous multi-threaded environment, the processing of the messages is typically performed in parallel by multiple threads. In a multi-threaded environment, it is possible that one thread can race ahead of another thread and cause the messages to be processed out of order. In the example above, a multi-threaded environment would allow the target enterprise application to receive and process the first update prior to creating the customer business object. If the target enterprise application receives the first update prior to creating the customer business object, the target enterprise application has nothing to update. As a result, one or more exceptions may be created in the target enterprise application, which may cause a variety of problems and ultimately lead to errors.

A synchronous singled threaded environment, in which a client cannot return until the target computer processes data at the target computer, could be utilized, but is not scalable. A large number of computing devices will not work optimally in such an environment. Businesses are generally interested in utilizing batch processing, which allows a series of jobs to be queued at the target computer for processing. Accordingly, businesses are more interested in working in an asynchronous multi-threaded environment because of the ability to utilize parallel processing, which allows for greater efficiency with respect to processing such as batch processing.

Specialized components could also be built to ensure that threads are processed in the intended order. However, such an approach is intrusive. In other words, businesses would have to purchase additional software components that would have to be configured to work with existing software technology. Further, the existing software technology may have to be configured to allow for integration of the specialized components. This intrusive configuration may lead to a large expense and loss of valuable productivity time for most businesses.

SUMMARY

In one aspect of the disclosure, a computer program product comprises a computer useable medium having a computer readable program. The computer readable program when executed on a computer causes the computer to select, as an event sequencing group, a subset of one or more functions in a component. Further, the computer readable program when executed on the computer causes the computer to provide an event sequencing qualifier for each function in the subset. The event sequencing qualifier indicates that event sequencing is to be performed for a plurality of events that request utilization of the one or more functions. In addition, the computer readable program when executed on the computer causes the computer to select one or more object attributes as an event sequencing key. The computer readable program when executed on the computer also causes the computer to receive an event that requests use of a function in the event sequencing group. Further, the computer readable program when executed on the computer causes the computer to determine if the function is in the event sequencing group. In addition, the computer readable program when executed on the computer causes the computer to determine a value for the event sequencing key for the event if the function is in the event sequencing group. The computer readable program when executed on the computer also causes the computer to provide a lock for the function to the event so that the event can be processed if no other event having the same value of the event sequencing key has the lock for the function. Finally, the computer readable program when executed on the computer causes the computer to prevent the event from being processed if another event having the same value for the event sequencing key has the lock for the function.

In yet another aspect of the disclosure, the computer readable program can be implemented as a method. Accordingly, the method can perform the functionality of the computer readable program without a computer program product.

In another aspect of the disclosure, a system is disclosed. The system has a repository that stores a plurality of events. Each event requests to utilize one or more functions in a component. An event sequencing module analyzes an event sequencing key of the event if the event requests a function having a component definition that includes an event sequence qualifier. The event sequencing module grants a lock to the event for the function if no other event having the same value of the event sequencing key has the lock for the function. Further, the event sequencing module prevents the event from being processed if another event having the same value for the event sequencing key has the lock for the function. In addition, the event sequencing key is composed of one or more object attributes. Finally, the system has a worker server that receives the event, if the event obtains the lock, and processes the function requested by the event.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

A non-intrusive approach can be utilized to ensure that events, which are requests or responses that flow through one or more components that make up a system, are received and processed in the intended order. An example of such a system is a purchase order system that creates an event when a user places an order for a product. The purchase order system may also create an event when a user updates the order for the product, e.g., changing the quantity of products ordered. In one embodiment, the event includes metadata such as the name of the target component to be invoked, the operation to be invoked, and the parameters for the invocation and/or the returns from the invocation.

As will be discussed, an event sequencing qualifier can be added to a component to ensure that the business data received by the component is processed in the intended order. In one embodiment, functionality can be added to an existing component by adding the event sequencing qualifier to the definition of the component. As business data may flow through a series of other components before reaching the target enterprise application, an event sequencing qualifier can also be placed in each of these components. As a result, event sequencing that is non-intrusive can be attained in a multi-threaded environment.

For illustrative purposes, the event sequencing approach described herein is utilized in a Service Component Architecture ("SCA"). One of ordinary skill in the art will understand that the principles taught here in can be implemented utilizing any other programming model that allows for asynchronous multi-threading. The SCA is a programming model on which a process server, such as a Websphere process server, can be built. The SCA provides a service oriented view on top of existing J2EE component models and APIs. Each SCA component is defined using the Service Component Definition Language ("SCDL"). Further, components can communicate with one another by utilizing a messaging engine such as the Service Integration Bus ("SIB"). The components communicate by sending and receiving messages to and from SIB destinations.

Figure 1:
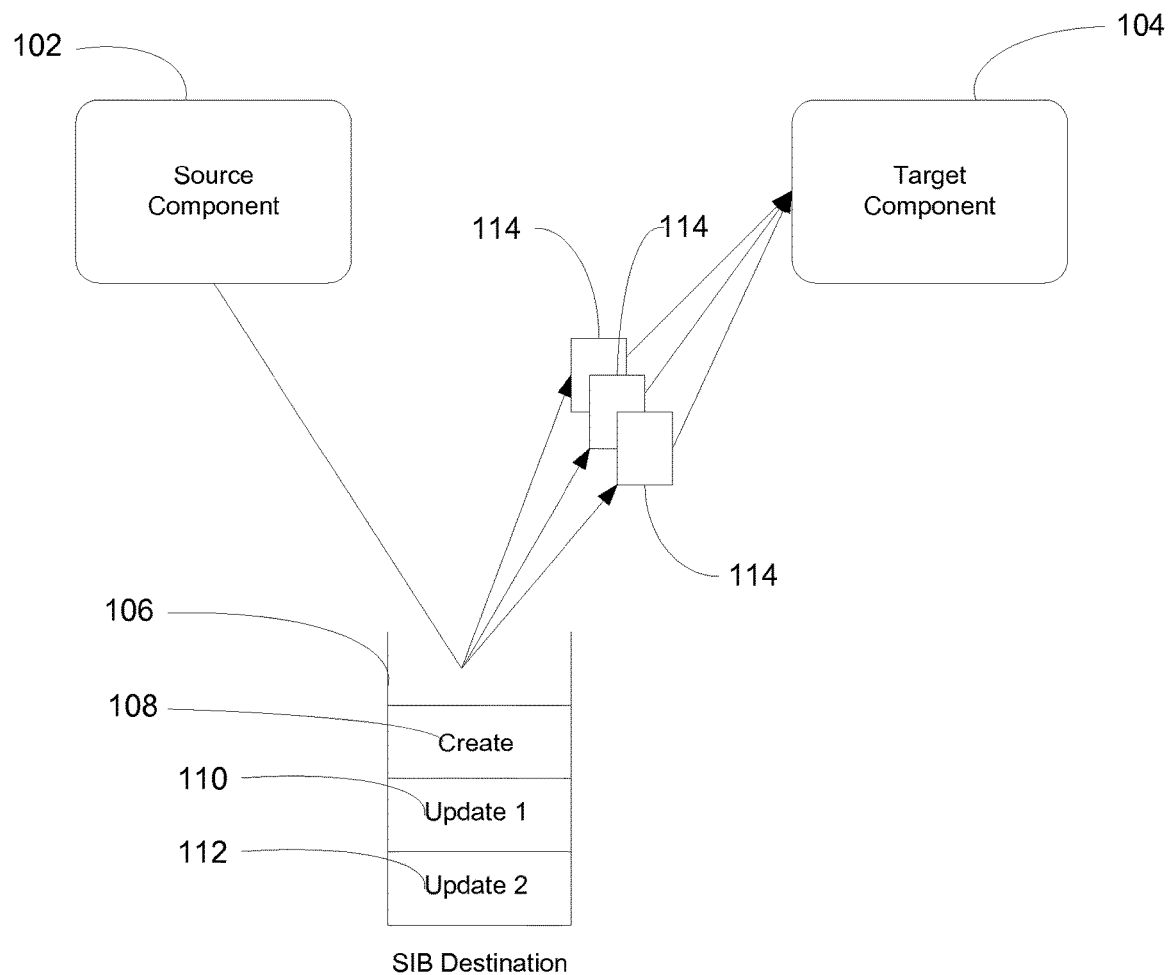
FIG. 1 illustrates a series of components that utilize asynchronous multi-threading.

FIG. 1 illustrates a series of components that utilize asynchronous multi-threading. A source component 102 looks at an interface for a target component 104 to determine what functions are available for the target component 104. The term function is intended to include a method, procedure, or any other similar software module. For example, the target component 104 may have an interface coded in Web Services Description Language ("WSDL") that has methods for business data. The interface for the target component 104 may have a method entitled "create" and a method entitled "update."

Accordingly, if a user purchases a product, the source component 102 can asynchronously invoke the create method of the interface for the target component 104 to create a purchase order. In addition, if the user decides to make a modification to the purchase order, e.g., a change in the quantity of the product purchased, the source component 102 can asynchronously invoke the update method of the interface for the target component 104 to update the purchase order. The user may choose to make multiple updates to the purchase order. Accordingly, the source component 102 would asynchronously invoke the update method multiple times. Each invocation would correspond to a modification of the purchase order by the user. For instance, if the user makes two modifications, the source component 102 invokes a first update with the update method and a second update with the update method.

In one embodiment, the SCA architecture provides for an SIB destination 106 in which a message can be stored for transmission between the source component 102 and the target component 104. In one embodiment, a message can be created for each invocation of a method in the interface of the target component 104 by the source component 102. For instance, the source component 102 can create and send a message 108 for the create invocation, a message 110 for the first update, and a message 112 for the second update. A software module 114 reads each message and transmits the message to the target component 104. In one embodiment, the software module 114 is a message driven bean ("MDB"). Further, multiple instances of the MDB are created to correspond to each message and, thereby, allow for multi-threading and parallel processing. Accordingly, the MDB thread corresponding to the message 110 for the first update or the MDB thread corresponding to the message 112 for the second update may be potentially processed before the MDB thread corresponding to the message 108 for the creation. Further, the MDB thread corresponding to the message 112 for the second update may be potentially processed before the MDB thread corresponding to the message 110 for the first update.

In one embodiment, the use of the event sequencing qualifier involves an event acquiring a lock before the event is dispatched to the target component 104 for execution of business logic. When execution of the business logic at the target component 104 is completed, the event releases the lock. If an event cannot acquire a lock, i.e., because another event has the lock, then execution of the invocation for that event is suspended. At a later point in time, e.g., when the other event releases the lock, the event will be dispatched to the target component 104.

A user can specify that event sequencing is to be implemented for a particular component by providing an event sequencing qualifier for the component. The event sequencing qualifier indicates to the runtime application that invocations to one or more operations should be sequenced. The sequencing is performed based on event sequencing key that is specified as part of the event sequencing qualifier.

XML can be utilized to provide the schema for the event sequencing qualifier in the function. An example XML schema for an event sequencing qualifier is:

```xml
<?xml version="1.0" encoding="UTF-8"?>
<schema xmlns="http://www.w3.org/2001/XMLSchema"
xmlns:es="http://www.ibm.com/xmlns/prod/websphere/wbiserver/eventSequencing/6.0.0"
xmlns:scdl="http://www.ibm.com/xmlns/prod/websphere/scdl/6.0.0"
targetNamespace="http://www.ibm.com/xmlns/prod/websphere/wbiserver/eventSequencing/6.0.0">
<import
    namespace="http://www.ibm.com/xmlns/prod/websphere/scdl/6.0.0"
    schemaLocation="scdl.xsd" />
<!-- Event sequencing Qualifier -->
<!-- We may not need following substitutionGroup. Added it to follow the way SCA defined its qualifiers -->
<element name="eventSequencingQualifier" type="es:EventSequencingQualifier" substitutionGroup="scdl:interfaceQualifier"/>
    <complexType name="EventSequencingQualifier">
        <complexContent>
            <extension base="scdl:InterfaceQualifier">
                <sequence>
                    <element name="eventSequencing" type="es:EventSequencing"/>
                </sequence>
            </extension>
        </complexContent>
    </complexType>
    <complexType name="EventSequencing">
        <sequence>
            <element name="keySpecification" type="es:KeySpecification"/>
        </sequence>
        <attribute name="sequencingGroup" type="string" default="default"/>
        <attribute name="continueOnError" type="boolean" default="true"/>
    </complexType>
    <complexType name="KeySpecification">
    <sequence maxOccurs="unbounded">
        <element name="parameter" type="Parameter"/>
    </sequence>
</complexType>
<complexType name="Parameter">
    <sequence minOccurs="0" maxOccurs="unbounded">
        <!-- xpath not required for Simple Types -->
        <element name="xpath" type="string"/>
    </sequence>
    <attribute name="name" type="string" use="required"/>
</complexType>
```

In one embodiment, the event sequencing qualifier is provided to the component by adding an event sequencing qualifier to the method in the definition of the component.

An example of a component definition with an event sequencing qualifier that is built upon the SCA standard is provided:

```xml
<?xml version="1.0" encoding="UTF-8"?>
<scdl:component xmlns:xsi="http://www.w3.org/2001/XMLSchema-instance"
xmlns:ns1="http://EventS/ProcessOrder"
xmlns:es=http://www.ibm.com/xmlns/prod/websphere/wbiserver/eventSequencing/6.0.0
xmlns:scdl="http://www.ibm.com/xmlns/prod/websphere/scdl/6.0.0"
xmlns:wsdl="http://www.ibm.com/xmlns/prod/websphere/scdl/wsdl/6.0.0"
displayName="Component1" name="Component1">
    <interfaces>
        <interface xsi:type="wsdl:WSDLPortType" portType="ns1:ProcessOrder">
            <method name="create">
            <scdl:interfaceQualifier xsi:type="es:EventSequencingQualifier">
            <es:eventSequencing sequencingGroup="default" continueOnError="true">
                <keySpecification>
                    <parameter name="newOrder">
                        <xpath>id</xpath>
                    </parameter>
                </keySpecification>
            </es:eventSequencing>
            </scdl:interfaceQualifier>
            </method>
            <method name="update"/>
            <scdl:interfaceQualifier xsi:type="es:EventSequencingQualifier">
            <es:eventSequencing sequencingGroup="default" continueOnError="true">
                <keySpecification>
                    <parameter name ="newOrder">
```

```
            <xpath> id</xpath>
         </parameter>
            </keySpecification>
         </es:eventSequencing>
      </scdl:interfaceQualifier>
      <method name="retrieve"/>
   </interface>
 </interfaces>
</scdl:component>
```

The sequencingGroup attribute groups related operations that need to be sequenced together. Further, KeySpecification defines the key that will be used to identify the events that need to be sequenced. In one embodiment, one KeySpecification is provided per method. The name attribute is the name of the parameter and the xpath specified is applied to the parameter to extract a value that will be part of the key. A user can specify a parameter element for each parameter that is going to contribute to the key.

For the create method, the key is constructed from the id attribute of the parameter newOrder. Since create and update are in the same group, if an invocation of create holds on to a lock, then an invocation of update will be suspended until a lock can be acquired.

In one embodiment, the invocation can have parameters which are business objects. Further, the event sequencing key can be a combination of business object attributes.

An example of a business object can be a purchase order. The purchase order business object can have business object attributes such as id, customer, product name, and quantity. The following schema is an example of code that can be utilized for the purchase order business object:

```
<?xml version="1.0" encoding="UTF-8"?>
<xsd:schema xmlns:xsd="http://www.w3.org/2001/XMLSchema"
targetNamespace="http://EventS">
   <xsd:complexType name="Order">
      <xsd:sequence>
         <xsd:element minOccurs="0" name="id" type="xsd:string"/>
         <xsd:element minOccurs="0" name="customername"
         type="xsd:string"/>
         <xsd:element minOccurs="0" name="productname"
         type="xsd:string"/>
         <xsd:element minOccurs="0" name="quantity" type="xsd:int"/>
      </xsd:sequence>
   </xsd:complexType>
</xsd:schema>
```

In one embodiment, the event sequencing runtime program sequences events having the same event sequencing key. For example, the event sequencing key can be the id attribute. The id attribute for each event will be determined. Each subset of events having the same id attribute is event sequenced. For example, event qualifiers may be established in the definition of the target component 104 such that the create and update methods are to have event sequencing for events requesting the create and/or update methods that have the same event sequencing key, i.e., the same id attribute. If a user purchases a first and a second product, events related to the first product will have an event sequencing key of one (the id of the first product) and events related to the second product will have an event sequencing key of two (the id of the second product). For instance, a first invocation may call the create method to create a purchase order for the first product. The id for the first invocation equals one and the quantity can equal ten to reflect that the user wants ten of the first product. The first invocation requests processing and receives a lock since there are no other invocations with having the same event sequencing key, i.e., an id equaling one. A second invocation may call the update method for the first product to reflect that the user would like to change the quantity ordered from ten to fifteen. However, the second invocation is unable to be processed while the first invocation (which has the same event sequencing key, i.e. an id equaling one, as the second invocation) holds the lock. The execution of the second invocation is suspended. Once the first invocation is finished processing, the first invocation can release the lock and allow the second invocation to acquire the lock so that it can be processed. In one embodiment, the runtime application detects completion by the first invocation and releases the lock from the first invocation to provide it to the next invocation having the same event sequencing key that requested the lock, i.e., the second invocation. Execution of the second invocation can then resume. Accordingly, events that should be performed in a particular order are isolated to ensure a proper sequence. As a result, exceptions in target components (which can lead to losses in productivity, efficiency, etc.) can be avoided.

A set of events having a different event sequencing key from another set of events can be processed in parallel to enhance the efficiency of a system. In the example above, a third invocation may call the create method to create a purchase order for the second product. The id equals two and the quantity can equal six to reflect that the user would like to purchase six of the second product. As the third invocation has a different event sequencing key than the first invocation, i.e. the first invocation has an id equaling one and the third invocation has an id equaling two, and there is no other invocation having the same event sequencing key and a lock, the third invocation is not prevented from being processed and acquires a lock. A fourth invocation may call the update method to reflect a change to the customer's order for the second product. The id equals two and the quantity can equal twelve to reflect the customer's modification to purchase twelve of the second product. However, the fourth invocation is prevented from being processed until the invocation with the same event sequencing key and a lock, i.e., the third invocation, is finished being processed and releases the lock. The execution of the fourth invocation is suspended. In one embodiment, the runtime application detects completion by the third invocation and releases the lock from the third invocation to provide it to the next invocation having the same event sequencing key that requested the lock, i.e., the fourth invocation. Execution of the fourth invocation can then resume.

In another embodiment, the event sequencing runtime program sequences events that (1) have the same event sequencing key and (2) are in the event sequencing group. An event sequencing group is a group of functions whose events should be sequenced together. If these events are not sequenced together, errors may occur. As discussed above, the create and update methods should be performed in a particular order to avoid exceptions in target components. However, the order of execution of other methods in the component may not have an impact on the performance of the system. For example, the target component 104 may have a method entitled retrieve in addition to the create and update methods. A user may utilize the retrieve method to view some business data, but ultimately the time at which the user views the business data may not have an impact on the creation or updating of a purchase order. Accordingly, the retrieve method may not be declared as part of the event sequencing group where as the create and update methods are declared as part of the event sequencing group. As a result, a subsequent call to the retrieve method for the first product may be processed before an initial call to the retrieve method for the first product even though event sequencing is utilized for the create and update methods.

Figure 2:
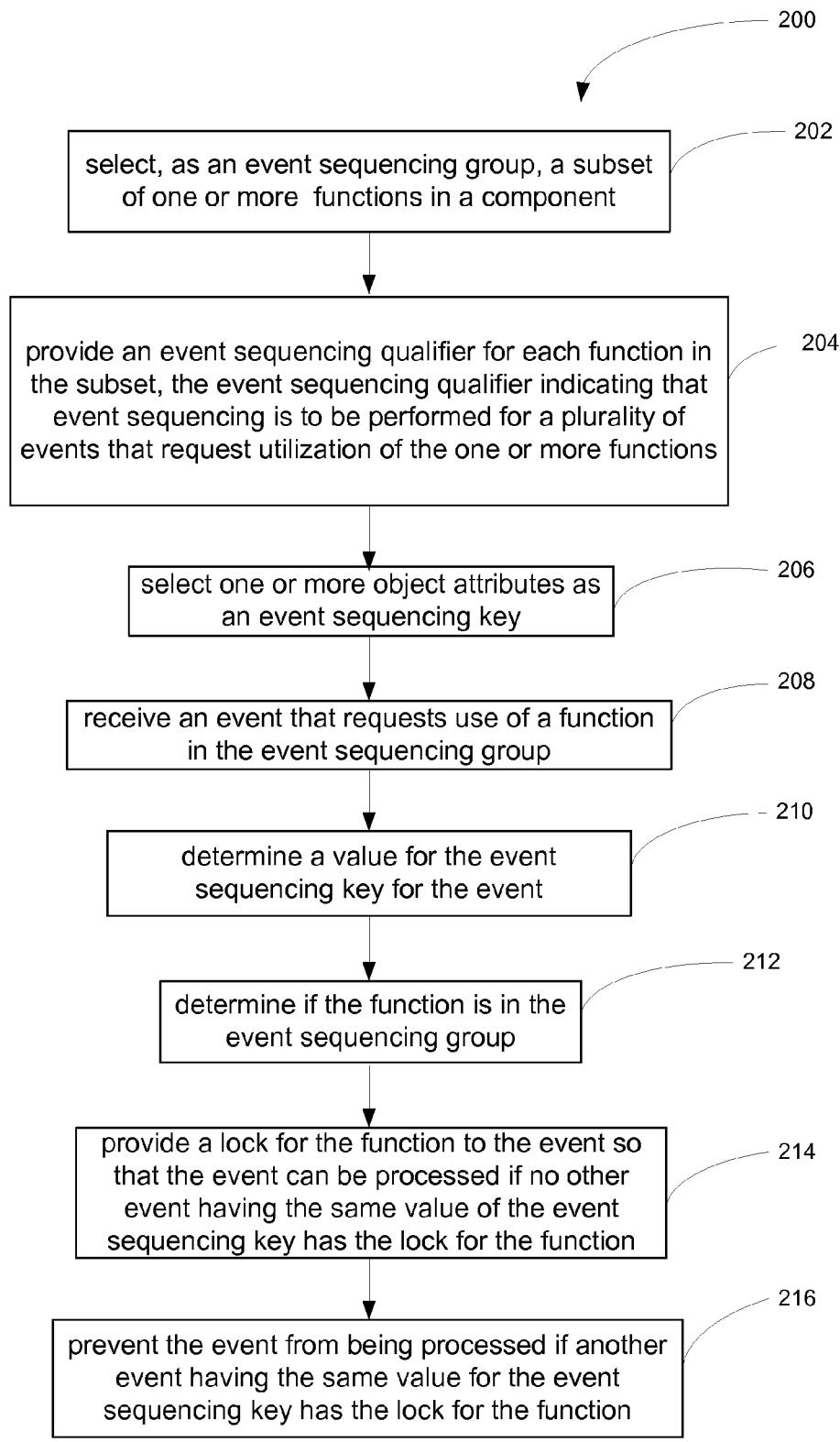
FIG. 2 illustrates a process that utilizes an event sequencing qualifier.

FIG. 2 illustrates a process 200 that utilizes an event sequencing qualifier. At a process block 202, the process 200 selects, as an event sequencing group, a subset of one or more functions in a component. In the example above, the one or more functions may be the create, update, and retrieve methods. For example, the process 200 may select the create and update methods to be included in the event sequencing group, but not the retrieve method, because the ordering of operations for the create and update methods may have an impact on the performance of the system. In one embodiment, the subset may include all of the functions defined in the component, e.g., the create, update, and retrieve methods. Further, at a next process block 204, the process 200 provides an event sequencing qualifier for each function in the subset. The event sequencing qualifier indicates that event sequencing is to be performed for a plurality of events that request utilization of the one or more functions. In another embodiment, the process 200 can provide the event sequencing qualifier without additional components. In other words, the process 200 is non-intrusive as businesses do not have to purchase or build additional components to perform event sequencing. The event sequencing qualifier can be added to a preexisting definition of each function in the component without interfering with the operation or altering the code in the preexisting definition. Further, the event sequencing qualifier is removable from the definition of each function in the component without interfering with the operation or altering the code in the preexisting definition. In addition, the event sequencing qualifier can be added at any point within a system, as opposed to fixed points such as adapters. The event sequencing qualifier can be added to any component within the system. For instance, if components are built utilizing SCA, the event sequencing qualifier can be added to the definition of any component in the system.

At a next process block 206, the process 200 selects one or more object attributes as an event sequencing key. In the example above, the product id object attribute was selected as the event sequencing key. However, a combination of object attributes, e.g., product id and purchaser name, could have been utilized as the event sequencing key. Further, at a next process block 208, the process 200 receives an event that requests use of a function in the event sequencing group. In the example above, the process 200 may receive an event requesting the update method. In addition, at a next process block 210, the process 200 determines if the function is in the event sequencing group. At a next process block 212, the method 200 also determines a value for the event sequencing key for the event. For example, the event may request an update for the first product, i.e., an event sequencing key having a value that equals one. At a next process block 214, the process 200 provides a lock for the function to the event so that the event can be processed if no other event having the same value of the event sequencing key has the lock for the function. For example, the event requesting the update method for the first product can obtain a lock if there are no other events requesting an operation on the first product that have a lock, e.g., an invocation for the create method or another invocation of the update method. Further, at a next process block 216, the process 200 prevents the event from being processed if another event having the same value for the event sequencing key has the lock for the function. In the example above, an invocation for the first product was attempted when an invocation for the first product to the create method had a lock so that an exception at the target component 104 was avoided.

In another embodiment, the target component 104 can receive a flow control attribute that enhances the quality of service. The flow control attribute can indicate an amount of data flow that the target component 104 should receive within a given time period. Further, in yet another embodiment, the target component 104 can receive a filter attribute that indicates a filter for business data that the target component 104 is to receive. For instance, the filter attribute may indicate a maximum price value for products whose orders the target component 104 should process.

Figure 3:
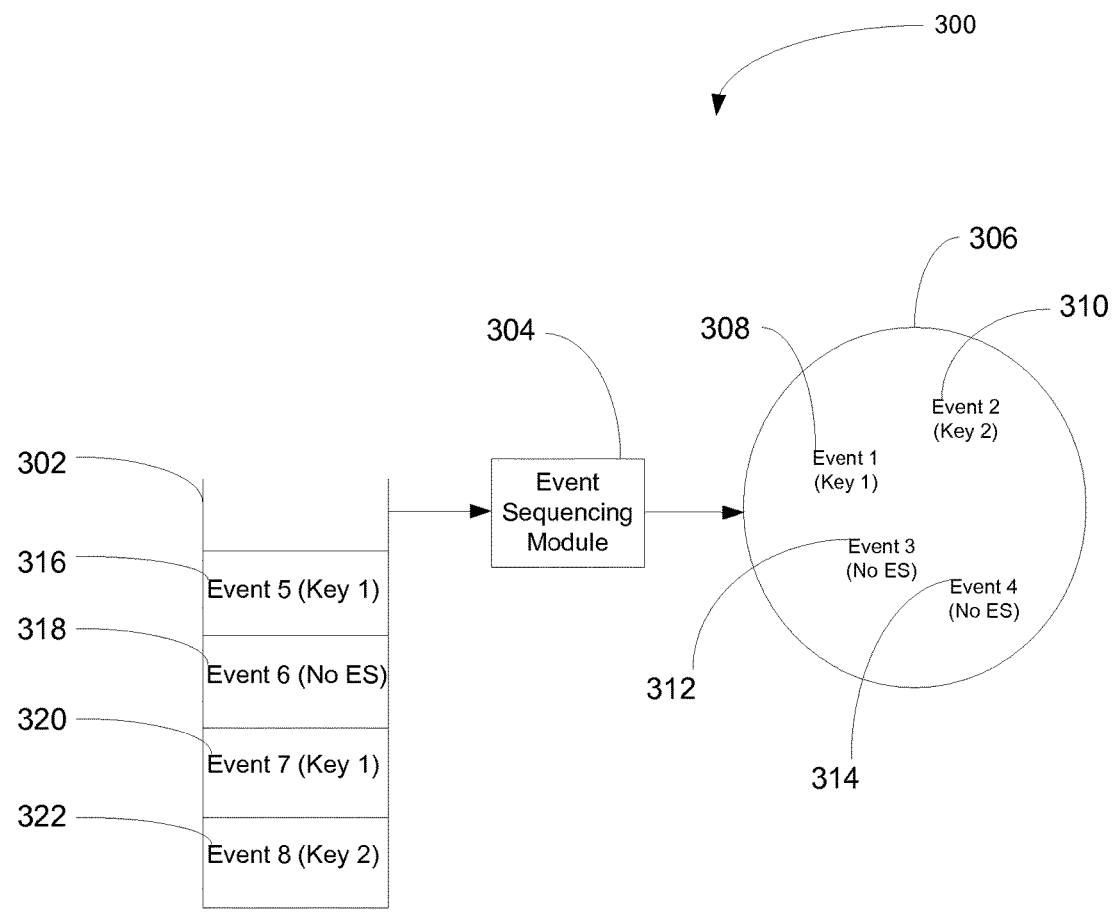
FIG. 3 illustrates an event sequencing configuration.

FIG. 3 illustrates an event sequencing configuration 300. A repository 302 holds events that are waiting to obtain a lock, if needed, to be processed. An example of the repository 302 is the SIB destination 106. An event sequencing module 304 provides a lock to an event if the lock is available and allows the event to be processed on a worker server 306. The event sequencing module 304 can provide computer code to perform this operation. For example, a first event 308 obtained a lock and is being processed in the worker server 306. The first event has Key1 and was not prevented from obtaining a lock because no other event having Key1 had a lock at the time that the first event 308 requested a lock from the event sequencing module 304. The lock allowed the first event 308 to be processed in the worker server 306. Further, a second event 310 has Key2 and was able to obtain a lock because the first event 308 has a different key and no other event with Key2 had a lock at the time that the second event 310 requested a lock. The second event 310 may have even requested the same function as the first event 308, but parallel processing can still occur because the event sequencing key is different. Accordingly, the first event 308 and the second event 310 can be processed in parallel in the worker server 306. Further, a third event 312 and a fourth event 314 are events which request functions that the event sequencing module 304 determines to not be part of an event sequencing group. Therefore, the event sequencing module 304 determines that no event sequencing ("ES") is to be performed for the third event 312 and the fourth event 314, and allows the third event 312 and the fourth event 314 to be processed, in parallel with each other and the first event 308 and the second event 310, in the worker server 306.

The repository 302 holds a fifth event 316 which has an event sequencing key value of Key1. Accordingly, the event sequencing module 304 prevents the fifth event 316 from entering the worker server 306 to be processed because the first event 308 holds a lock for Key1. Further, the repository 302 holds a sixth event 318 which requests a function that is not in the event sequencing group. Accordingly, the event sequencing module 304 allows the sixth event 318 to proceed to the worker server 306 for processing while still suspending the first event 308. In addition, the repository holds a seventh event 320 which has an event sequencing key value of Key1. As with the fifth event 316, the seventh event 320 is suspended in the repository 302 because the first event 308 has a lock. The repository also holds an eighth event 322 which has an event sequencing key value of Key2. The eighth event 322 is suspended n the repository 302 because the second event 310 has a lock.

In one embodiment, the event sequencing module 304 detects the completion of the processing of events in the worker server 306 to release a lock from an event and provide it to another event that has the same key and is suspended in the repository 302. For instance, if the second event 310 is the first to complete processing, the event sequencing module 304 detects completion and releases the lock from the second event 310 to provide it to the eighth event 322. Accordingly, the eighth event 322 is allowed to enter the worker server 306 for processing event though the fifth event 316 and the seventh event 320 made earlier requests because the first event 308 has not completed processing so that the lock for Key1 can be released to the fifth event 316 or the seventh event 320. Once the first event 308 completes processing, the lock is released and provided to the fifth event 316 as the fifth event 316 made an earlier request than the seventh event 320.

In one embodiment, the event sequencing module includes a lock manager. The lock manager is an event sequencing runtime internal component that manages locks for the event sequencing runtime. Further, the lock manager is a persistent lock manager in that the locks are persisted to a database. Persisting the lock ensures that the lock continues to exist after a server crashes and restarts. In addition, the lock manager queues lock request for the same lock in the order of the lock requests. The lock manager can provide a lock operation, which saves the lock request to the database and returns true if the lock is acquired. If the lock cannot be acquired, the request is still saved to the database, but the method returns false. Further, the lock manager can provide an unlock operation, which deletes the current lock and grants the lock to the next lock request. Granting a lock involves resuming the invocation associated with the lock.

Figure 4:
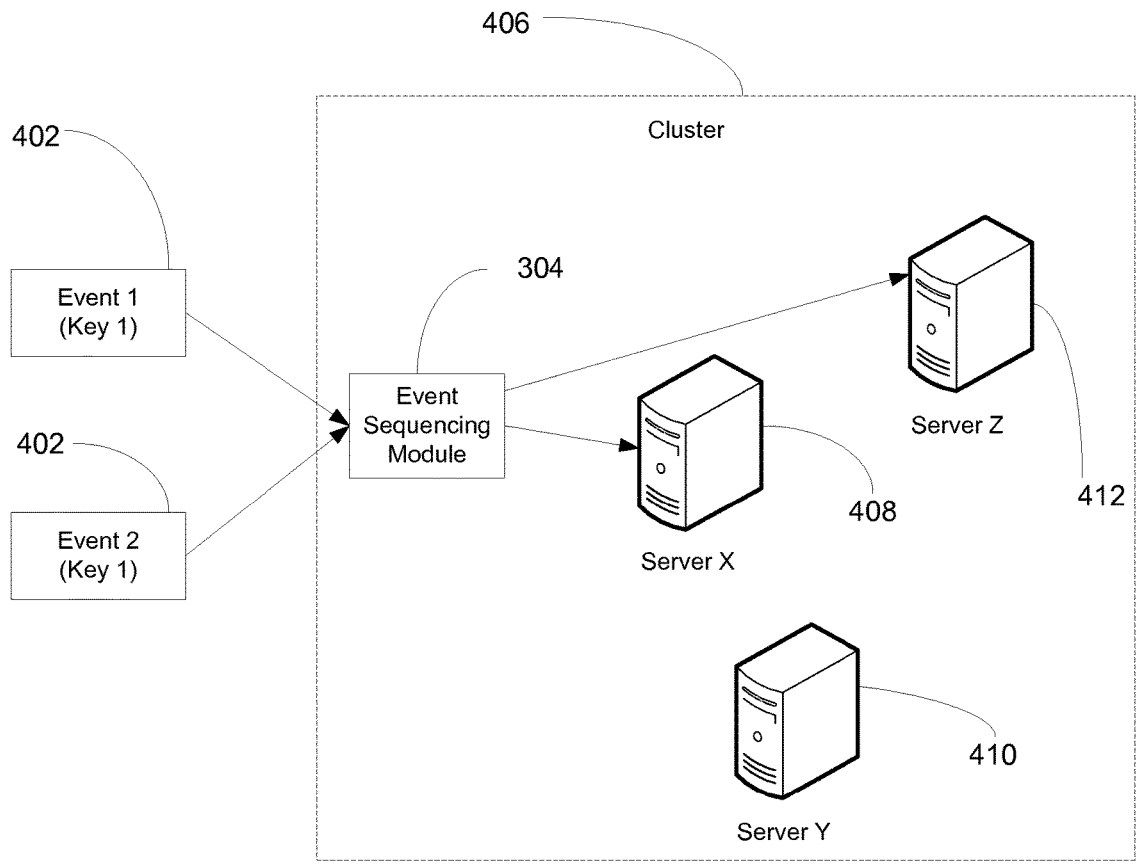
FIG. 4 illustrates a configuration in which event sequencing is utilized for a cluster of servers.

FIG. 4 illustrates a configuration in which event sequencing is utilized for a cluster of servers. The servers in a cluster are clones of one another. A cluster is often utilized by large web sites that receive many request for functions on a server. To increase throughput, these web sites have many servers with the same component. Accordingly, clustering is utilized in many commercial applications to provide scalability and handle large volumes of traffic.

A first event 402 and a second event 404 may have the same key and request functions for a component that is cloned on different servers in a cluster 406. For instance, the first event 402 may be a request to utilize the create method and the second event 404 may be a request to utilize the update method. The cluster 406 may dispatch the first event 402 to the cloned version of the target component deployed on a server Z 412 while the cluster 406 may dispatch the second event 404 to the cloned version of the target component deployed on a server X 408. Accordingly, one server could perform an operation on business data irrespective of the other server's operation on the business data. As a result, the second event 404 could be processed before the first event 402, which would lead to an exception at the server Z 412 because an update would be performed on business data that has not been created yet.

The cluster 406 can utilize the event sequencing module 304 to intercept events before the events are distributed to the servers in the cluster 406. As in the case of a single server, the event sequencing module 304 provides a lock to an event before the event is allowed to be dispatched to the worker server for processing.

The cluster 406 may include a larger number of servers. For illustrative purposes, a server Y 410 is shown in FIG. 4 to demonstrate that other servers may not be utilized by a particular set of events in an event sequencing group.

Further, the process 200 can be utilized in a clustered environment. The component can be provided on a plurality of different servers in the cluster 406. Further, the process 200 provides a lock for the function to the event so that the event can be processed if no other event having the same value of the event sequencing key has the lock for the function on any one of the servers in the cluster. In addition, the process 200 prevents the event from being processed if another event having the same value for the event sequencing key has the lock for the function on any one of the servers in the cluster.

In one embodiment, a High Availability ("HA") manager can be provided to so that a single point of failure can be avoided for the event sequencing module 304. Whether a cluster or a single worker server is utilized, the event sequencing module 304 can read messages from one or more destinations as a singleton. In the event of a crash, the HA manager ensures that the event sequencing module 304 can continue to operate as a singleton on another server.

Figure 5:
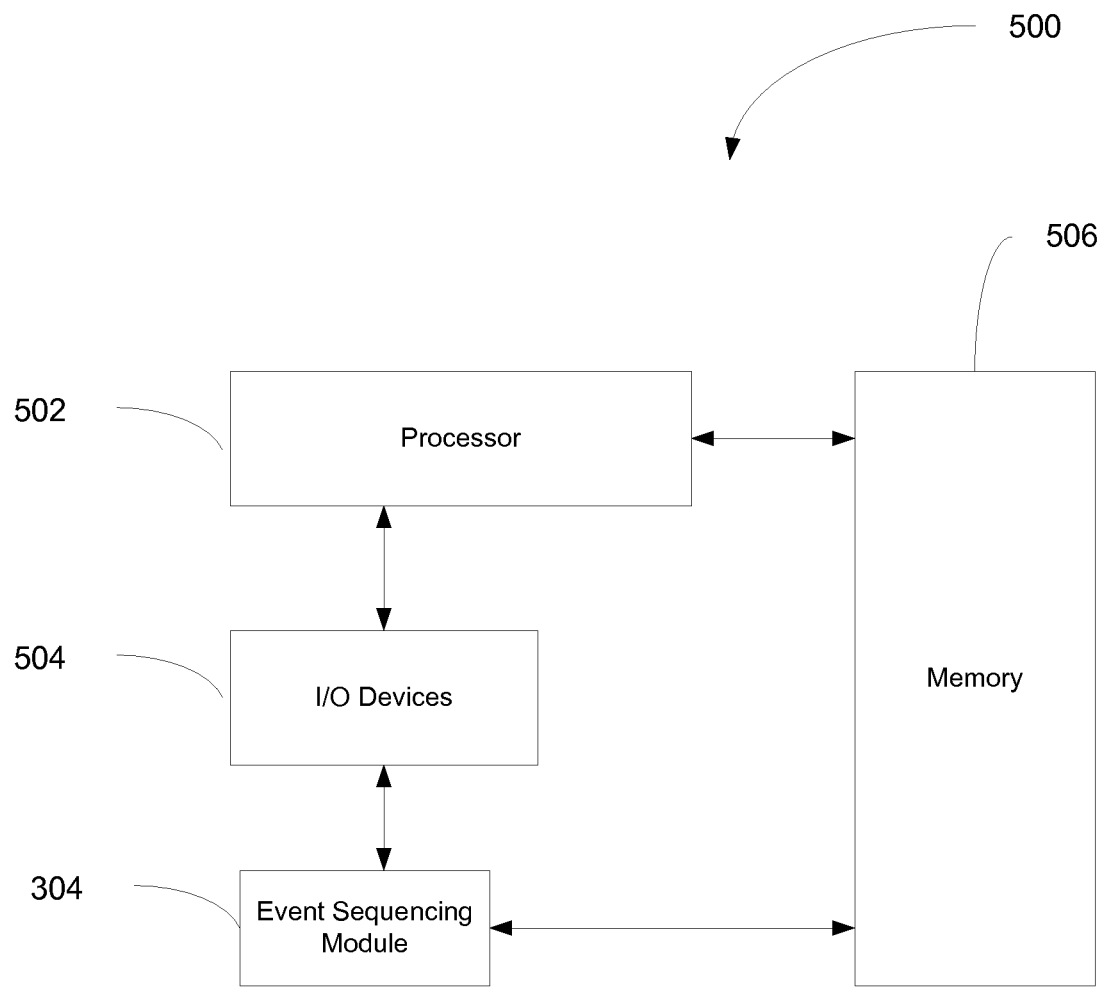
FIG. 5 illustrates a block diagram of a system that utilizes event sequencing with an event sequencing qualifier.

FIG. 5 illustrates a block diagram of a system 500 that utilizes event sequencing with an event sequencing qualifier. In one embodiment, the system 500 is suitable for storing and/or executing program code and is implemented using a general purpose computer or any other hardware equivalents. Thus, the system 500 comprises a processor 502, a memory 506, e.g., random access memory ("RAM") and/or read only memory ("ROM"), the event sequencing module 304, and various input/output devices 504.

The processor 502 is coupled, either directly or indirectly, to the memory 506 through a system bus. The memory 506 can include local memory employed during actual execution of the program code, bulk storage, and/or cache memories which provide temporary storage of at least some program code in order to reduce the number of times code must be retrieved from bulk storage during execution.

The input/output devices 504 can be coupled directly to the system 500 or through intervening input/output controllers. Further, the input/output devices 504 can include a keyboard, a keypad, a mouse, a microphone for capturing speech commands, a pointing device, and other user input devices that will be recognized by one of ordinary skill in the art. Further, the input/output devices 404 can include a receiver, transmitter, speaker, display, image capture sensor, biometric sensor, etc. In addition, the input/output devices 404 can include storage devices such as a tape drive, floppy drive, hard disk drive, compact disk ("CD") drive, etc.

Network adapters may also be coupled to the system 500 to enable the system 500 to become coupled to other systems, remote printers, or storage devices through intervening private or public networks. Modems, cable modems, and Ethernet cards are just a few of the currently available types of network adapters.

It should be understood that the method and system described herein can take the form of an entirely hardware embodiment, an entirely software embodiment, or an embodiment containing both hardware and software elements. If software is utilized to implement the method or system, the software can include but is not limited to firmware, resident software, microcode, etc.

Further, the method and/or system can take the form of a computer program product accessible from a computer-usable or computer-readable medium providing program code for use by or in connection with a computer or any instruction execution system. For the purpose of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a RAM, a ROM, a rigid magnetic disk and an optical disk. Current examples of optical disks include CD-read only memory ("CD-ROM"), CD-read/write ("CD-R/W") and DVD.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

We claim:

1. A computer program product comprising a non-transitory computer useable medium having a computer readable program, wherein the computer readable program when executed on a computer causes the computer to:
   select, as an event sequencing group, a subset of one or more functions in a component;
   provide, prior to a request for utilization of the one or more functions, an event sequencing qualifier for each function in the subset, the event sequencing qualifier indicating that event sequencing is to be performed for a plurality of events that request utilization of the one or more functions;
   select one or more object attributes as an event sequencing key;
   receive an event that requests use of a function in the event sequencing group;
   determine a value for the event sequencing key for the event based on the function being in the event sequencing group;
   provide a lock for the function to the event so that the event can be processed based on no other event having the same value of the event sequencing key having the lock for the function, the lock for the function not preventing the function from being processed in parallel for a different event with a different event sequencing key; and
   prevent the event from being processed based on another event having the same value for the event sequencing key having the lock for the function.

2. The computer program product of claim 1, wherein the event sequencing qualifier is provided in each function in the subset without additional components.

3. The computer program product of claim 1, wherein the computer readable program when executed on the computer further causes the computer to dispatch the event to a worker server for processing based on the event having the lock for the function.

4. The computer program product of claim 1, wherein the computer readable program when executed on the computer further causes the computer to suspend dispatch of the event to a worker server for processing based on if another event having the same value for the event sequencing key having the lock for the function.

5. The computer program product of claim 1, wherein the event sequencing qualifier is added to a preexisting definition of each function in the subset without interfering with operation or altering code in the preexisting definition.

6. The computer program product of claim 5, wherein the event sequencing qualifier is removable from the definition of each function in the subset without interfering with the operation or altering the code in the preexisting definition.

7. The computer program product of claim 1, wherein the subset includes all of the one or more functions in the component.

8. The computer program product of claim 1, wherein the component includes a function that is not selected for the event sequencing group.

9. The computer program product of claim 8, wherein the computer readable program when executed on the computer further causes the computer to process, in parallel, the event and an additional event that requests the function that is not selected for the event sequencing group.

10. The computer program product of claim 1, wherein the component is built utilizing Service Component Architecture.

11. The computer program product of claim 1, wherein an Extensible Markup Language schema is utilized to provide the event sequencing qualifier for each function in the subset.

12. The computer program product of claim 1, wherein the computer readable program when executed on the computer further receives a flow control attribute that enhances quality of service.

13. The computer program product of claim 1, wherein the computer readable program when executed on the computer further causes the computer to receive a filter attribute that enhances quality of service.

14. The computer program product of claim 1, wherein the component is deployed on a cluster of servers.

15. The computer program product of claim 14, wherein the computer readable program when executed on the computer further causes the computer to determine whether a server in the cluster is processing another event having the lock for the function and the same event sequencing key value prior to providing the lock to the event.

16. The computer program product of claim 14, wherein the computer readable program when executed on the computer further causes the computer to determine whether a server in the cluster is processing another event having the lock for the function and the same event sequencing key value prior to preventing the lock to the event.

17. A method comprising:
   selecting, as an event sequencing group, a subset of one or more functions in a component;
   providing an event sequencing qualifier for each function in the subset, the event sequencing qualifier indicating that event sequencing is to be performed for a plurality of events that request utilization of the one or more functions;
   selecting one or more object attributes as an event sequencing key;
   receiving an event that requests use of a function in the event sequencing group;

determining a value for the event sequencing key for the event based on the function being in the event sequencing group;

providing a lock for the function to the event so that the event can be processed based on no other event having the same value of the event sequencing key having the lock for the function, the lock for the function not preventing the function from being processed in parallel for a different event with a different event sequencing key; and preventing the event from being processed based on another event having the same value for the event sequencing key having the lock for the function.

18. The method of claim 17, wherein the event sequencing qualifier is provided in each function in the subset without additional components.

19. The method of claim 17, wherein the event sequencing qualifier is added to a preexisting definition of each function in the subset without interfering with operation or altering code in the preexisting definition.

20. The method of claim 19, wherein the event sequencing qualifier is removable from the definition of each function in the subset without interfering with the operation or altering the code in the preexisting definition.

21. The method of claim 17, wherein the subset includes all of the one or more functions in the component.

22. The method of claim 17, wherein the component is deployed on a cluster of servers.

23. The method of claim 22, further comprising determining whether a server in the cluster is processing another event having the lock for the function and the same event sequencing key value prior to providing the lock to the event.

24. The method of claim 22, further comprising determining whether a server in the cluster is processing another event having the lock for the function and the same event sequencing key value prior to preventing the lock to the event.

25. A system comprising:
a repository that stores a plurality of events, each event requesting to utilize one or more functions in a component;

an event sequencing module, executed by a processor, that analyzes an event sequencing key of the event based on the event requesting a function having a component definition that includes an event sequence qualifier, the event sequencing module granting a lock to the event for the function based on no other event having the same value of the event sequencing key having the lock for the function, the event sequencing module preventing the event from being processed based on another event having the same value for the event sequencing key having the lock for the function, the event sequencing key being composed of one or more object attributes, the lock for the function not preventing the function from being processed in parallel for a different event with a different event sequencing key; and a worker server that receives the event, based on the event obtaining the lock, and processes the function requested by the event.

26. The system of claim 25, wherein the event sequencing qualifier is added to the component definition of the function without additional components.

27. The system of claim 25, wherein the event sequencing qualifier is added to a preexisting component definition of the function without interfering with operation or altering code in the preexisting component definition of the function.

28. The system of claim 27, wherein the event sequencing qualifier is removable from the component definition of the function without interfering with the operation or altering the code in the preexisting component definition of the function.

29. The system of claim 25, wherein the component is deployed on a cluster of servers.

30. The system of claim 25, wherein the component is built utilizing Service Component Architecture.

* * * * *